INVENTOR
ETIENNE ARTHUR MARIE SCHATTEMAN by: Wolfe, Hubbard, Voit + Osann
ATTYS.

INVENTOR
ETIENNE ARTHUR MARIE SCHATTEMAN by: Wolfe, Hubbard, Voit & Osann
ATTYS.

INVENTOR
ETIENNE ARTHUR MARIE SCHATTEMAN
by: Wolfe, Hubbard, Voit & Osann
ATTYS.

United States Patent Office 3,433,428

Patented Mar. 18, 1969

3,433,428

STOP SYSTEM FOR TAPE DECKS

Etienne Arthur Marie Schatteman, Wemmel, Belgium, assignors to Staar, S.A., Brussels, Belgium, a corporation of Belgium Filed Oct. 31, 1966, Ser. No. 590,613

Claims priority, application Belgium, July 8, 1966, 30,628

U.S. Cl. 242—55.13 11 Claims

Int. Cl. G11b *15/32*

ABSTRACT OF THE DISCLOSURE

A stop system particularly useful with tape cartridge recorder-players and designed automatically to disengage the drive elements of a tape deck from the tape whenever tape motion is stopped. The system is responsoive to stoppage due not only to the complete unreeling of the tape from the supply reel, as well as to breakage of the tape but to stoppage due to the interruption of electric power to the player-recorder as well.

This invention relates to apparatus for the recording and playback of sound from a magnetic tape in a self-contained cartridge or cassette. More particularly, the invention concerns automatic disengagement of certain tape recorder drive elements from the tape when the machine is stopped to prevent possible damage to the drive elements and to the tape itself.

An important advantage of cartridge-loading tape recorders is that loading and removing the tape from the machine is greatly simplified. Certain driving elements of the tape deck mechanism must, however, enter the cartridge to provide means for controllably driving the tape past the sound head. If the commonly-used capstan and pinch roller drive system is employed, one of these elements must pentrate the cartridge to engage the tape and the other element must be brought into position to pinch the tape between them. Tape transport spindles must also enter the reel hubs of the cartridges to provide tape tensioning and driving force when the machine is in operation.

A device for stopping the action of tape drive mechanism or initiating some other operation when the tape is no longer in motion is disclosed in my co-pending application Ser. No. 553,992, filed May 31, 1966, entitled Stop System for a Drive. Briefly stated, this system comprises a sensing means which detects the slowing or stopping of the tape reel spindle. Upon sensing this change in the rate of reel rotation, other circuit elements are actuated to perform whatever function may be desired, such as rewinding of the tape or stopping of the tape drive elements.

When cartridge-loading tape decks are adapted for use with other sound equipment, such as car radios, television sets, and audio equipment having sound systems through which the tape decks are operated, power for operating the tape deck is generally derived from the electrical system of the associated equipment rather than from self-contained batteries or from any other independent source. The power to the tape deck is thus subject to interruption from switches in the circuitry of the associated equipment as well as those of the tape deck itself, and if such interruption occurs while the tape deck is being operated, the tape drive elements will remain engaged with the tape, and damage to both the drive elements and the tape may result from the prolonged pressure and contact in the engaged position. If the commonly-used capstan and pinch roller drive system is employed, there is the possibility that the continued pressure of the capstan on the pinch roller in one place will cause the pinch roller to develop a flat spot, or otherwise lose the concentricity which is essential to proper operation.

The present invention has particular, but not exclusive utility in tape decks having a drive carriage shiftable with the tape cartridge between released and operating positions and which carries the capstan and reel spindles into drive relation with the tape and reel hubs in the cartridge. A tape deck having these features is disclosed in co-pending application of Theophiel C. J. L. Staar for a Tape Deck, Ser. No. 567,115, filed July 22, 1966.

During the operation of tape decks of the type described, it is often desirable to stop the action of the tape drive mechanism when the supply reel has been emptied. If this is not done, the drive mechanism will continue to run even though no more tape remains on the reel. If the trailing end is securely fastened to the supply reel, the motion of the tape past the still-moving drive elements will be arrested with the attendant risk of excessive wear from slippage of the drive elements and the tape itself as the drive elements continue to exert a pulling force on the motionless tape and the inconvenience of the circuit continuing to run without any purpose.

In view of the foregoing, it is a principal obqect of the resent invention to provide a stop system for tape decks which will positively disengage the drive elements of the tape deck when the power supply is interrupted by any means, particularly means other than the normal controls of the tape deck itself. It is further intended to achieve such a system which is adapted for use with tape decks of the sort employed in motor vehicles in which the power supply for such accessories is separately controlled by a master switch, such as an ignition switch.

Another object of the present invention is the provision of a stop system of the type described for use with tape decks having a shiftable drive carriage which carries the various drive elements into engagement with a cartridge to drive the tape past a sound head, with operation of the deck being initiated by the mere insertion of the cartridge by the operator. Provision is also made by which the stop system of the present invention is effective not only to disengage the various drive elements from the tape cartridge, but to return the cartridge to a released position where it may be withdrawn by the operator.

Other objects and advantages of the invention will become apparent upon reading the following detailed description and upon reference to the drawings, in which.

While the invention will be described in connection with a preferred embodiment, it will be understood that I do not intend to limit the invention to that embodiment, but intend to cover all alternative and equivalent constructions as may be included within the spirit and scope of the invention as defined by the appended claims.

Figure 1:
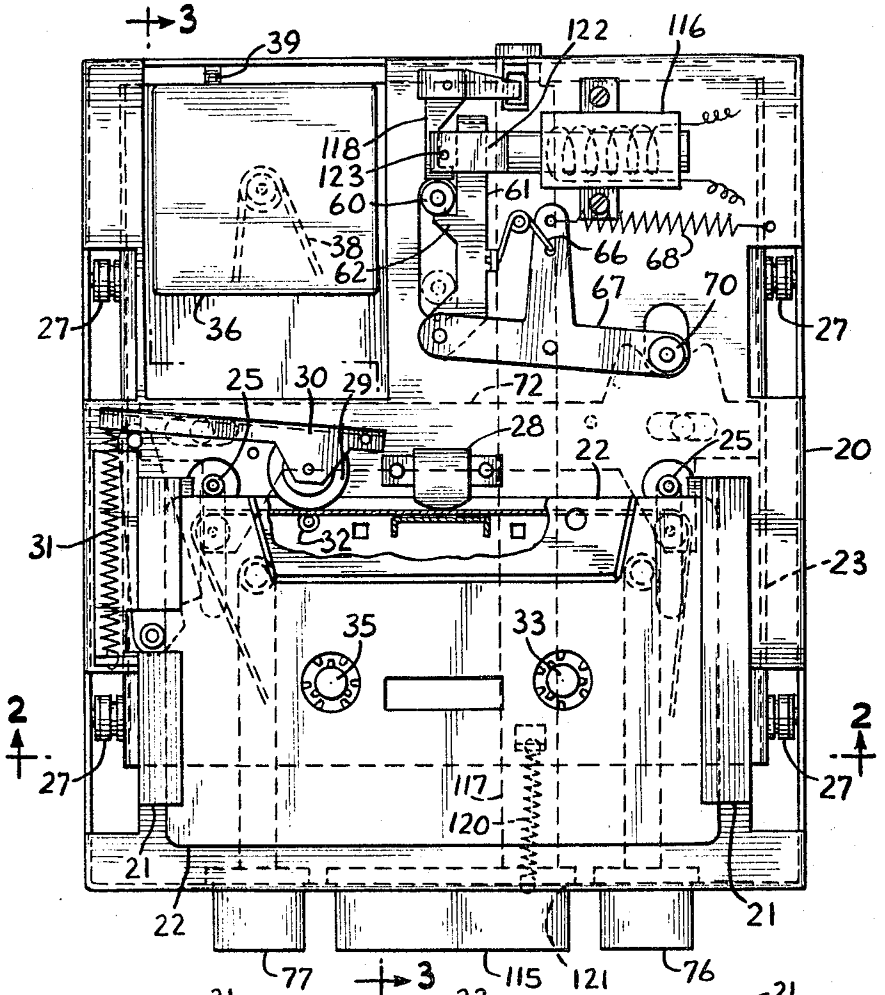
FIGURE 1 is a plan view of the tape deck mechanism of the present invention with a tape cartridge shown in position for recording or playback, and with the associated electronics and exterior covers of the machine being omitted for clarity.

Turning to the drawings, there is shown in FIG. 1 a tape deck constructed according to the present invention. The principal features and method of operation of the tape deck in general will be briefly described as they relate to the present invention, but for a more detailed description the reader is referred to the co-pending application of Theophiel Clement Jozef Lodewijk Staar for a Tape Deck, Ser. No. 567,115, filed July 22, 1966.

The tape deck drive mechanism comprises a fixed frame or chassis 20 to which are attached guides 21 having grooves or slots into which a tape cartridge 22 may be introduced by the operator. The driving elements of the tape deck are carried by a movable frame or drive carriage 23 disposed beneath the chassis 20 and movable so that the drive elements enter into penetrating engagement with the tape cartridge 22 when the latter is inserted into operating position.

As the cartridge 22 slides into operating position, it is guided by the guides 21 into engagement with a pair of upright lugs 25 and drives them forward in their slots in the chassis 20. The lugs 25 are hollow and contain slidable pins 26 which extend upwardly from the drive carriage 23. Each lug 25 is provided with a flange at its base to confine its movement to a path coplanar with the movement of the cartridge 22 in the guides 21. When moved forward by the motion of inserting the cartridge 22, the lugs 25 cause the drive carriage 23 to swing in the direction of cartridge movement with a rising motion which causes the various drive elements to penetrate the respective openings of the cartridge 22 and become operably engaged therewith. This motion is accomplished solely by the drive carriage 23, with the cartridge 22 being restricted by the guides 21 to a direct in-and-out movement in a single lateral plane.

The drive carriage 23 is suspended from the chassis 20 by four links 27, which are pivoted at each end to form an articulated parallelogram linkage which is deformed on insertion of the cartridge 22 to swing with a rising motion in the direction of cartridge movement. As the cartridge 22 is introduced, contact with the lugs 25 and slidable pins 26 causes the drive carriage 23 to move upward and forward with a movement coinciding exactly with that of the cartridge so that if the cartridge 22 is taken as a point of reference, the drive elements rise vertically into the cartridge 22 with no relative lateral movement whatever.

A sound head 28 and a pinch roller 29 are carried by the chassis 20 and do not move with the drive carriage 23. The pinch roller is journalled to a pivoted arm 30 which is tensioned by a spring 31. It will be understood that while a single sound head 28 is shown in the present embodiment, a plurality of sound heads including a recording head, reproducing head and an erase head could be employed in the same manner with equal success.

Carried by the drive carriage 23 are the drive elements by which the tape is driven and controlled within the cartridge 22. A capstan 32 engages the tape against the pinch roller 29 (FIG. 1) to draw the tape past the sound head 28. In addition, the supply and takeup reels within the catrridge 22 are engaged by a supply reel spindle 33 and a takeup reel spindle 35 respectively which are also carried by the drive carriage 23.

Figure 2:
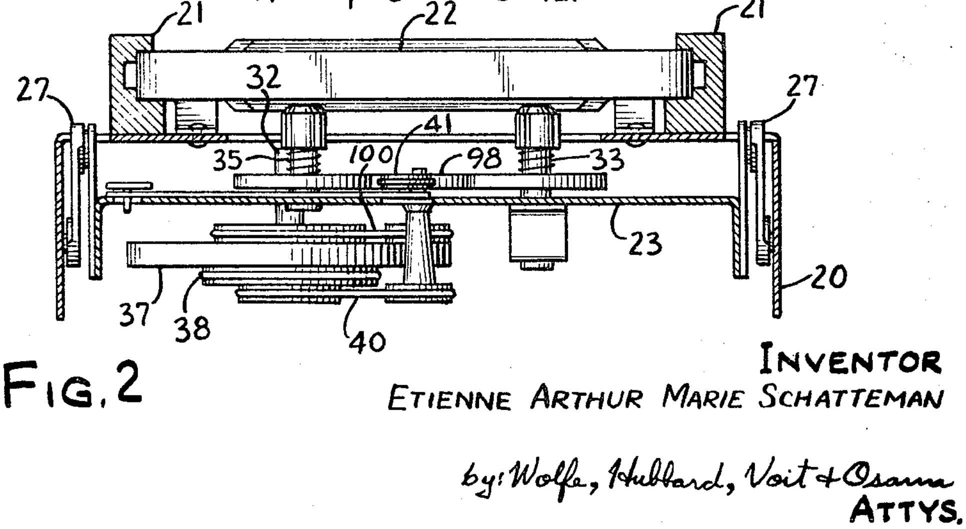
FIG. 2 is a section taken in the plane 2—2 of FIG. 1.

A drive motor 36 is also fixed to the drive carriage 23 and shifts in unison with the other drive elements. The drive motor 36 powers both the capstan 32 and the takeup reel spindle 35, while the supply reel spindle 33 is restrained by a brake (not shown) to tension the tape slightly as it is drawn past the sound head 28. Since these elements are at all times fixed relative to one another, a simplified drive train is achieved. As shown in FIG. 2, the capstan 32 is directly secured to a flywheel 37 which is driven from the drive motor 36 by a first drive belt 38. A second drive belt 40 powers a takeup power roller 41 which, in turn, drives the takeup reel spindle 35 through a selectively interposable friction wheel (not shown). During rewind and fast forward functions, the friction wheel is withdrawn by a suitable mechanism (not shown) to allow the takeup reel spindle to rotate freely. The means for controlling the motor 36 comprises a switch 39 which is closed by the drive carriage 23 upon insertion of a tape cartridge into operating position by the operator.

Insertion of a tape cartridge 22 by the operator causes the drive carriage 23 to simultaneously engage and shift in unison with the cartridge to an operating position (FIG. 1) in which the various tape drive elements are effective to drive the tape past the sound head 28. As the drive carriage 23 reaches the operating position at the end of its travel, it actuates the switch 39 which energizes the drive motor 36 and commences the playing of the tape.

The drive carriage 23 is releasably retained in operating position in a manner which permits momentary shifting of the drive carriage 23 and cartridge 22 to a second position (not shown) in which the cartridge is withdrawn from the pinch roller 29 and sound head 28 while the remaining drive elements are effective to transport the tape in the rewind or fast forward functions. This is accomplished by providing on the drive carriage 23 a latching lug 60 which is engageable with a selectively shiftable latch 61 secured to the chassis 20. The latch 61 is provided with a shoulder 62 to retain the lug 60 during operation of the deck.

The latch is initially engaged and the tape deck placed in operation by insertion of a cartridge 22, which causes the drive carriage 23 and latching lug 60 to shift in the direction of cartridge movement until the lug 60 engages the angled reverse side of the latch shoulder 62. The latch 61 is thereby momentarily displaced, allowing the lug 60 to ride over the shoulder 62 and fall into place as illustrated in FIG. 1. The latch 61 is then resiliently snapped into latching engagement with the lug 60 by a hairpin spring 66. The latch 61 is not carried directly by the chassis 20, however, but is instead mounted on a separate shifting link 67 which is in turn pivoted to the chassis 20. The shifting link 67 is normally retained in the position shown in FIG. 1 by a latch spring 68.

Figure 3:
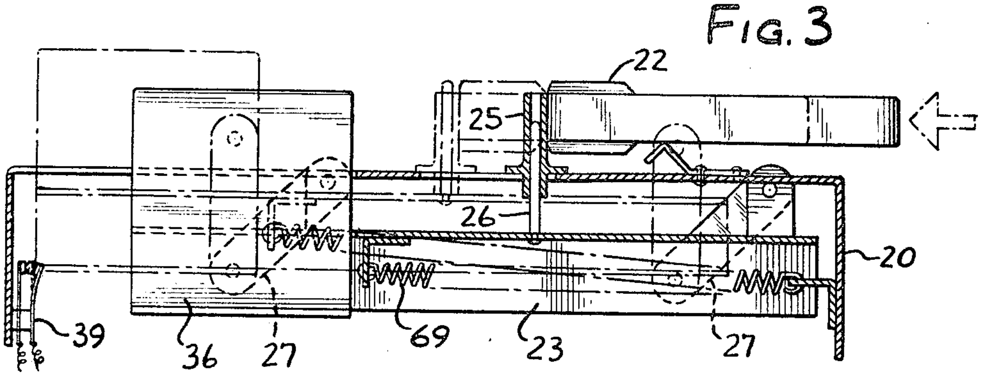
FIG. 3 is a section taken in the plane 3—3 of FIG. 1, with the released position of the drive carriage being shown in phantom.

The carriage return is accomplished by a pair of carriage return springs 69 (FIG. 3) which serve to resiliently urge the drive carriage toward the released position, and are prevented from doing so only by the engagement of the lug 60 with the shoulder 62 of the latch 61.

Figure 4:
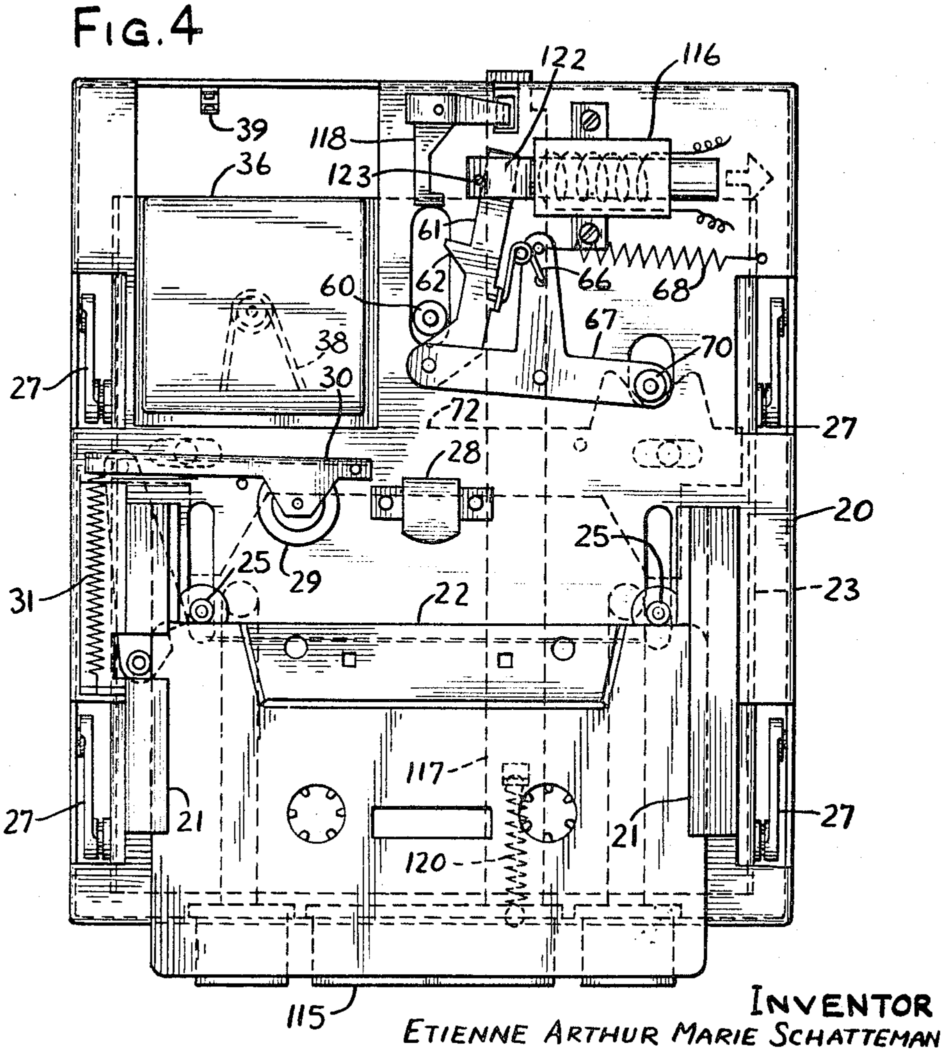
FIG. 4 is a plan view of the tape deck of FIG. 1 with the cartridge and drive carriage in the released or inoperative position.

The latch spring 68 is stronger than the carriage return springs 69 so that when the latch 61 is engaged, the latch spring 68 overbalances the carriage springs 69 to retain the lug 60 and thereby secure the drive carriage 23 in the position illustrated in FIG. 1 for recording and playback. In this position the capstan 32 engages the tape against the pressure of the pinch roller 29 to drive it past the sound head 28. Release of the latch 61 frees the drive carriage 23 and allows it to return to the released position (FIG. 4) thereby opening the switch 39 and stopping the motor 36, urged thereto by the springs 69.

As a principal feature of the invention, upon interruption of the electrical circuit to the tape deck for any reason, the drive carriage 23 is caused to be released from the latch 61 so that the carriage springs 69 may return the drive carriage 23 carrying the cartridge 22 to the released position as an incident of the indirect action of a solenoid 116. In this manner the drive elements are automatically disengaged from the cartridge and the tape.

Figure 5:
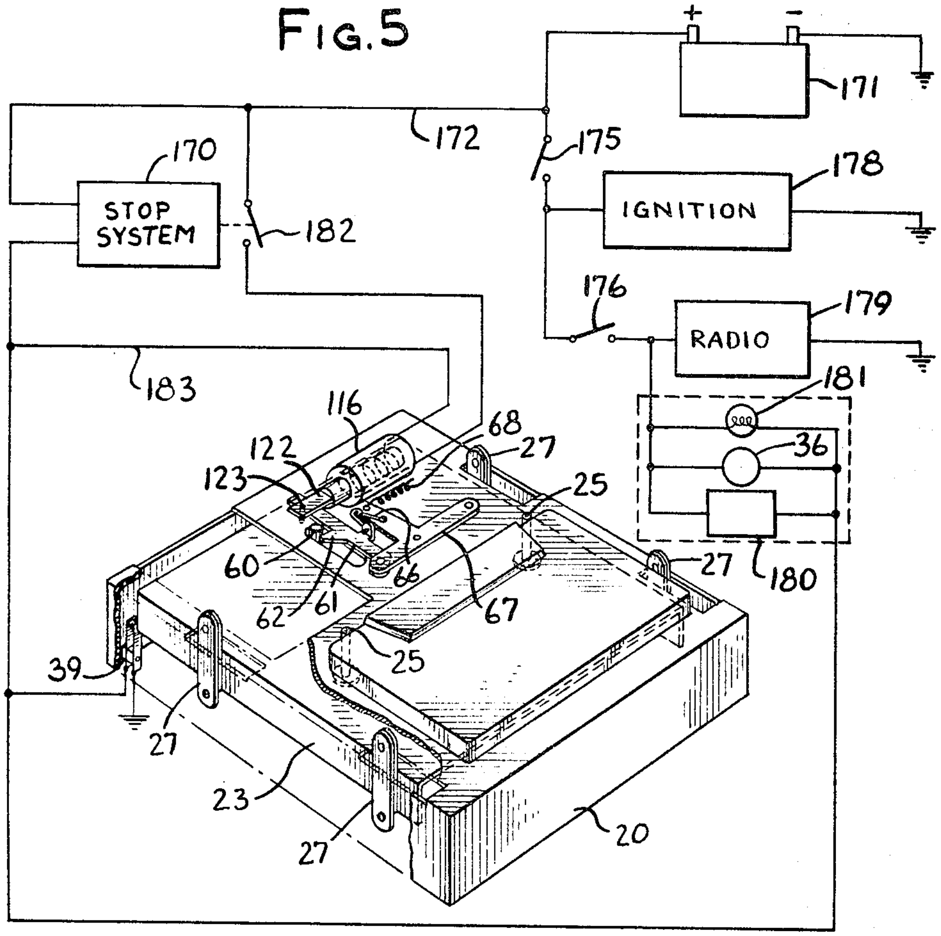
FIG. 5 is a schematic circuit diagram of the stop system of the present invention with the drive carriage latch release mechanism illustrated in fragmentary perspective.
Figure 6:
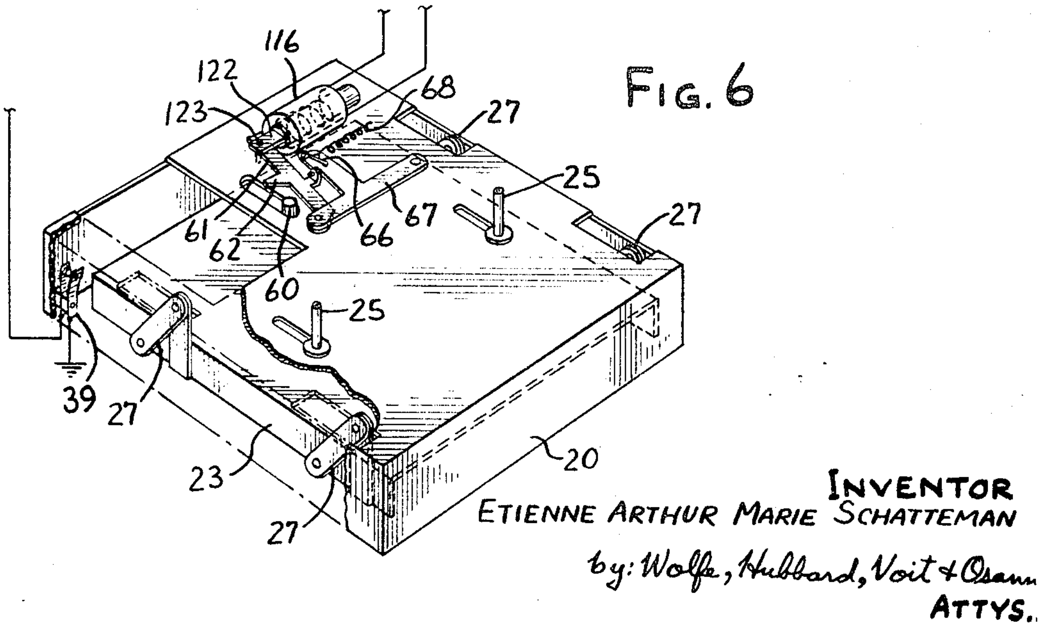
FIG. 6 is a fragmentary perspective similar to that of FIG. 5, in which the drive carriage is illustrated in the released position.

To accomplish release of the latch 61 automatically, circuit means including a stop circuit 170 which is operative whenever the motion of the tape stops, electrically energizes the solenoid 116 which is carried by the chassis 20 and has an actuator 122 engaging the latch 61 through a pin 123. As shown in FIG. 5, the pin 123 contacts the latch 61 independently of the release lever 118, so that the release lever and its associated mechanism is undisturbed by the release of the drive carriage 23 by the solenoid 116.

In order to illustrate a preferred form of the invention, although it will be understood that the invention has many other applications than in an automobile, a diagrammatic illustration of a tape deck circuit connected into an automobile ignition and radio circuit is shown in FIG. 5. As in the case of most modern automobiles the electrical accessories are connected to the battery 171 of the vehicle by way of the ignition switch 175, which acts as a master switch for all major accessories except for the lights, horn and other devices which must be independently operated for reasons of safety. The purpose of this method of wiring is to insure that none of the various accessories is left energized while the vehicle is not in use so that the battery is not inadvertently discharged while the vehicle is unattended. As is common, the present tape deck is shown in FIG. 5 installed as an adjunct to the radio 179, whereby the tape deck power is also controlled through the off-on switch 176 of the radio as well.

When a tape deck is installed in this manner, with the vehicle ignition switch 175 and the radio off-on switch 176 each serving to control the power supply to the tape deck, the possibilities are greatly increased that the tape desk switch will be left on although the tape deck is de-energized through the opening of one or more of the other switches in the circuit. In accordance with this invention, the stop circuit 170 is effective to energize the solenoid 116 whenever the motion of the tape in the tape deck is stopped, as for example, when the circuit to the tape drive is interrupted by opening the radio switch 176 or the ignition switch 175.

The principal requirement of the stop system 170 is that it must be capable of supplying an electrical impulse to the solenoid 116 which is sufficient to disengage the latch 61 from the latch pin 60 and thereby allow the drive carriage 23 to be drawn away from the sound head 28 and pinch roller 29 by the return spring 69, thereby disengaging the drive elements in a manner which prevents damage to the pinch roller 29 from prolonged contact at one spot in its periphery by the capstan 32. The stop system 170 is preferably constructed in the manner described in my co-pending application Ser. No. 553,992, mentioned previously.

As shown in FIG. 5, a source 171 is provided which in an automobile application may comprise the vehicle battery or any other suitable source of electrical energy. A line 172 connects the stop circuit 170 directly to the source 171. The control means in the electrical system which serve to control the supply of electrical energy to the tape deck include an ignition or control switch 175, and a radio off-on switch 176 such that with both the ignition 178 and radio 179 energized, the tape deck may be operated by inserting a tape cartridge into the tape deck. As the tape cartridge is inserted, it moves the drive carriage 23 forward to its operating position, and in the course of such movement, the drive carriage acts on the switch 39 mounted on the tape deck frame to close this switch and hold it closed. The circuit to the tape deck components 36, 180 is thus completed through the switch 39 and they become energized. These components illustratively represent the drive motor 36 and an electronics system 180 which is indicated generally in block form. To indicate to the operator that the motor 36 and electronics system 180 of the tape deck are energized, a pilot lamp 181 is also provided. After the tape deck has started to operate, in the event that either the automobile ignition switch 175 or radio switch 176 is opened, the connection from the plus (+) side of the battery 171 to the tape drive motor 36 will be interrupted, and the tape motion will stop. In response to the stopping of the tape, the stop system or circuit 170 will be energized to close the contacts 182 and thus connect one lead of the solenoid 116 to the plus (+) terminal of the battery 171 through the line 172 while the other lead 183 to the solenoid 116 is connected to ground via the switch 39 which is held closed by the drive carriage 23.

In keeping with a further feature of the invention, the energization by the stop circuit 170 of the solenoid 116 indirectly causes the stop circuit 170 to de-energize itself, since when the solenoid 116 is actuated and releases the latch 61, the drive carriage 20 is unlatched and opens the switch 39 which disconnects the stop circuit 170 from ground and effectively de-energizes it. The stop circuit switch 182 will also return to its normally open position, de-energizing the solenoid 116.

It will be seen, therefore, that the stop circuit 170 is energized independently of the rest of the tape deck components, such as the drive motor 36 and electronics 180, and is not controlled by the ignition switch 175 or radio off-on switch 176. The electrical circuit between the stop system 170 and the source 171 is nevertheless broken when the drive carriage 23 shifts to the released position so that further current drain on the source 171 is thereby prevented.

As a result of the employment of the present invention with the stop circuit as disclosed in my co-pending application Ser. No. 553,992, previously mentioned, damage to the pinch roller 29 and other drive elements through prolonged stationary engagement is prevented. When the end of the tape on the supply reel is reached, the stop circuit 170 is effective to disengage the drive carriage 23 and shift the cartridge 22 to the released position, thereby stopping the drive mechanism and de-energizing the tape deck electronics 180. Should the tape happen to break during use, the supply reel will similarly cease to rotate, causing the release to be effected in the same way. Should the tape deck be inadvertently left running when the radio 179 is turned off by the radio off-on switch 176, or should the ignition switch 175 be turned off, the stop circuit 170 is stil effective to release the drive carriage 23 because of its independent connection to the source 171 by the line 172.

It will be understood that to stop the operation of the tape deck in the normal way, the release push button 115 may be actuated which will unlatch the drive carriage 23 causing the switch 39 to be opened. This will disconnect the stop circuit 170 from ground or the negative (−) side of the battery in the same way the stop circuit is disconnected when the drive carriage is unlatched automatically.

I claim as my invention:

1. In a tape deck having a drive carriage shiftable with a tape cartridge between an operating position in which drive is engaged to move tape from a supply reel within the cartridge, and a released position in which said drive is disengaged, said drive being electrically driven from a source through a control switch, the combination comprising resilient means for urging said drive carriage from said operating position to said released position, a releasable latch retaining said drive carriage in said operating position, and stopping means for releasing said latch responsive to cessation of tape movement from said supply reel, whereby said drive carriage is shifted by said resilient means to said released position wherein said drive is disengaged.

2. The combination in a tape deck according to claim 1 having stopping means including a solenoid actuator operably engageable with said latch, and a stop system connected to energize said solenoid actuator from said source responsive to cessation of rotation of said supply reel.

3. The combination in a tape deck according to claim 1 having stopping means including a solenoid actuator engageable with said latch and energized from said source through a shut-off switch independently of said control switch, said shut-off switch being operative to de-energize said stopping means and said solenoid actuator upon the release of said latch.

4. The combination in a tape deck according to claim 2 in which said stopping means including said solenoid actuator are powered from said source independently of said control switch.

5. In a tape deck for use in a motor vehicle, the combination according to claim 4 in which said control switch comprises the ignition switch of the motor vehicle.

6. In a tape deck having a drive carriage shiftable with a tape cartridge between an operating position in which drive means is engaged to move tape within the cartridge, and a released position in which said drive means is disengaged, said drive means being adapted to be electrically energized from a source, the combination comprising, switching means actuated by the movement of said drive carriage to and from said operating position to de-energize and energize, respectively, said drive means from said source, a releasable latch retaining said drive carriage in said operating position, said stopping means for releasing said latch responsive to cessation of tape movement within said cartridge whereby said drive carriage is unlatched and shifted to said released position wherein said drive is disengaged and said drive means is de-energized.

7. The combination in a tape deck according to claim 6 in which said stopping means is also energized from said source through said switching means, so that said stopping means is effective to de-energize itself responsive to the unlatching of said drive carriage.

8. The combination in a tape deck according to claim 7 in which said stopping means and said drive means are energized from said source via independent electrical connections and a common connection to said switching means.

9. The combination in a tape deck according to claim 6 in which said stopping means is energized from said source independently of said drive means.

10. In a tape deck having motor means for powering drive elements and control means for controlling said motor means, said drive elements being engageable to drive tape from a supply reel past a sound head, a combination comprising shiftable means for disengaging said drive elements, stopping means including a stop system for actuating said shiftable means responsive to stoppage of tape movement from said supply reel regardless of the amount of tape still remaining on said reel, a source connected to energize said stopping means independently of said control means and said motor means, and means for de-energizing said stopping means in response to the actuation of said shiftable means.

11. The combination in a tape deck according to claim 9 in which said supply reel is contained within a cartridge and in which said drive elements include a capstan and a pinch roller, said shiftable means comprises a shiftable carriage for moving said cartridge, and said drive elements are disengageable from each other and from pinching the tape as an incident to movement of said carriage to the released position.

References Cited

UNITED STATES PATENTS 3,199,802 8/1965 Polley et al. ________ 242—55.13
3,208,682 9/1965 Pastor et al. ________ 242—55.12

LEONARD D. CHRISTIAN, *Primary Examiner.*